Dec. 24, 1963 W. S. WISNIEWSKI 3,115,177
BOLT RETAINERS
Filed June 30, 1961
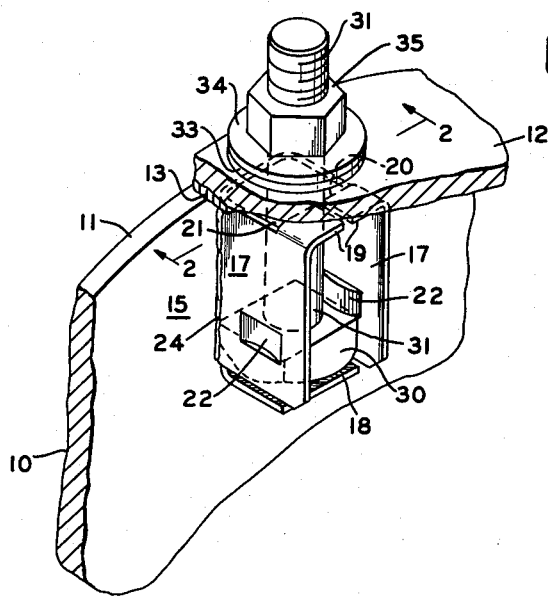
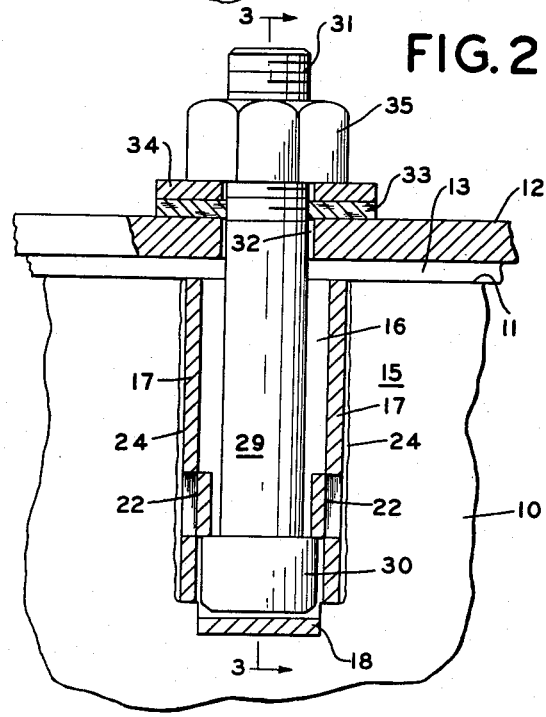
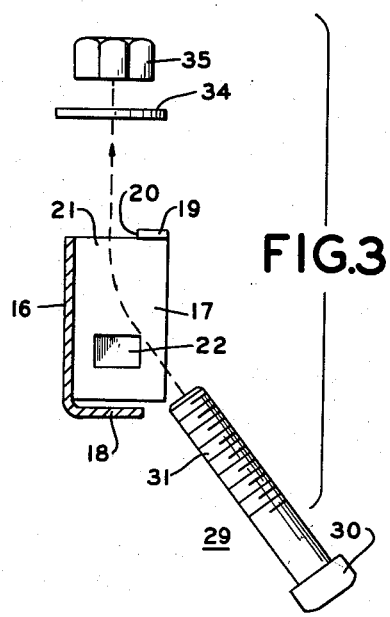
INVENTOR.
WALTER S. WISNIEWSKI
BY
ATTORNEY United States Patent Office 3,115,177
Patented Dec. 24, 1963

3,115,177
BOLT RETAINERS
Walter S. Wisniewski, Cheltenham, Pa., assignor to Repco Products Corporation, Philadelphia, Pa., a corporation of Pennsylvania
Filed June 30, 1961, Ser. No. 121,040
1 Claim. (Cl. 151—41.76)

This invention relates to bolt retainers.

In the fastening of covers and closures on the ends of boilers, tanks, and other vessels, it has heretofore been proposed to employ a retaining member in the form of an L-shaped rod welded at one end to the interior of the vessel, with the other and threaded end extending outwardly beyond the margin of the wall of the vessel for the reception of a nut and washer for tightening against the exterior of the cover or closure.

Difficulties have arisen particularly by reason of the stripping of the threads so that satisfactory retention cannot be effected. Removal of the damaged rod is then necessary with replacement by another rod. Rusting of the threads also occurs in a manner which may cause a weakened construction with resultant failure.

In an attempt to overcome the difficulties thus encountered, it has also been proposed to weld a nut to the interior of the side wall of the vessel and introduce a bolt downwardly through the cover for engagement with the nut. With this type of construction the initial location or placing of the bolt in the nut frequently presents difficulties of alignment so that installation is thereby made troublesome. With the bolt threads disposed in the interior of the vessel and in the presence of liquid rusting of the threads with seizure at their engagement with the nut may also occur with attendant difficulties upon attempted removal for access to the interior for cleaning, inspection or other purposes.

Other constructions for clamping a cover or the like to a receptacle have been proposed, but these are expensive, complicated in construction, and have not been widely accepted in the field.

It is the principal object of the present invention to provide a bolt retainer which can be quickly and easily secured to the wall of a vessel and which is adapted for the ready reception of a bolt for clamping a lid or cover in position on a vessel.

It is a further object of the present invention to provide a bolt retainer which upon installation, is ready for the reception and retention of a bolt, and which does not after installation require any bending or other deformation to hold the bolt in position for use.

It is a further object of the present invention to provide a bolt retainer in which a bolt may be readily inserted for use, and from which the bolt may be removed and replaced if desired, and which is effective in holding a bolt for clamping.

It is a further object of the present invention to provide a bolt retainer which can be quickly and easily formed from sheet metal and made as a stamping, which can be easily secured to the interior of a vessel by welding and which can have a bolt inserted or removed therefrom in a simple manner.

It is a further object of the present invention to provide a bolt retainer of unitary construction which in and of itself is adapted for the reception, retention, and removal of a bolt for clamping.

Other objects and advantageous features of the invention will be apparent from the description and claim.

The nature and characteristic features of the invention will be more readily understood from the following description, taken in connection with the accompanying drawings forming part thereof, in which:

FIGURE 1 is a view in perspective of a fragmentary portion of a vessel or receptacle and cover therefor, having the bolt retainer in accordance with the invention mounted thereon and with a bolt positioned therein in clamping relation;

FIG. 2 is an enlarged vertical sectional view taken approximately on the line of 2—2 of FIG. 1; and FIG. 3 is a fragmentary exploded view taken approximately on the line 3—3 of FIG. 2, but on a smaller scale.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, a portion of the side wall of a vessel or container which may be a tank, a domestic heating boiler, or other vessel, is shown at 10. The wall 10 has a terminal edge 11. A portion of a cover or closure plate is shown at 12 which is adapted to overlap the terminal edge 11. The cover plate 12, in certain applications, will be in direct engagement with the terminal edge 11, while, in other applications, it will have a gasket 13 interposed to provide a seal between the cover plate 12 and the side wall 10 of the vessel.

In accordance with the present invention, a bolt retainer 15 is provided, preferably in the form of an open sided rigid box made as a unitary or one piece sheet metal stamping with a vertical side or rear wall 16, spaced vertical side walls 17 integral with the rear wall 16, and extending perpendicularly forwardly therefrom, a horizontal bottom end wall 18 extending perpendicularly forwardly from the rear wall 16 with which it is integral and thus transversely with respect to the walls 16 and 17, and horizontal top end wall sections 19 integral with and extending horizontally toward each other from front portions of the side walls 17. The top wall sections 19 have rear margins 20 in spaced relation to the top of the rear wall 16 to provide an opening 21. The side walls 17, in predetermined spaced relation above the bottom wall 18 have opposite struck-in portions 22 which provide abutments for purposes to be explained.

The retainer 15 is preferably secured in position on the interior of the wall 10 of the vessel in any desired manner, such as by lines 24 of welding connecting the junctions of the rear and side walls 16 and 17 with the wall 10 of the vessel.

The retainers 15 are located on the wall 10 of the vessel in accordance with the particular bolt with which they are to be used, and are particularly adapted for the reception and retention of a machine bolt 29 having a square head 30 and a threaded shank 31, the square head 30, in loose condition, resting on and being supported by the bottom wall 18 and, in tightened position, engaging the abutment portions 22 on the side walls 17.

The top opening 21 provides for the easy introduction of the shank 31 of the bolt 29 (see FIG. 3), and the top wall sections 19 retain the bolt 29 in position and prevent undesired displacement of the shank 31 from a predetermined spaced relation to the rear wall 16 and the wall 10 when the bolt 29 is in a vertical position, as shown in FIGS. 1 and 2.

When it is desired to clamp the cover plate 12 in position, the same is assembled with the gasket 13 interposed as desired, and with the shank 31 of the bolt 29 extending through an appropriate opening 32 in the cover plate 12. When a pressure tight joint is desired, an additional gasket 33 may be placed on the shank 31 of the bolt 29 above the cover plate 12 with a washer 34 disposed thereabove, and the nut 35 applied and tightened to the desired position for retaining the cover 12 in place. Upon tightening of the nut 35, the head 30 is held against rotation by engagement with the walls 16 and 17. The top wall sections 19 may also aid in initially supporting the cover plate 12 prior to securing of the same in position, and as partial supports for the cover plate 12 when the same is clamped in place.

If for any reason it is desired to replace the bolt 29, this can be readily effected with the cover plate 12 removed. If the bolt 29 is injured in any way, this has no effect on the retainer 15, which is available for the insertion of another bolt 29 for clamping. The threaded shank 31 of the bolt 29 which is engaged with the nut 35 is essentially out of contact with the contents of the receptacle or vessel and is less likely to be corroded or eroded.

I claim:

A bolt retainer for a bolt having a head and a shank comprising a unitary metallic construction with an elongated vertical rear wall, a pair of elongated spaced vertical side walls integral with said rear wall and extending perpendicularly therefrom, a horizontal bottom wall end integral with and extending forwardly from said rear wall at one end thereof, horizontal top wall portions integral with said side walls, said top wall portions being connected to forward portions of said side walls and having their rear margins spaced from said rear wall to provide a bolt shank opening at the upper ends of the side walls, said walls and wall portions providing a box open at the side opposite said rear wall and closed at the bottom for the insertion of a bolt, and abutment members formed on a plurality of said walls for disposition of a bolt shank therebetween and for retaining the bolt head against movement in one direction, said bottom wall limiting movement of said bolt head in the opposite direction.

References Cited in the file of this patent

UNITED STATES PATENTS

| | | |
|---|---|---|
| 603,354 | Williston | May 3, 1898 |
| 1,086,861 | Schmidt | Feb. 10, 1914 |
| 2,748,906 | Flora | June 5, 1956 |
| 2,875,805 | Flora | Mar. 3, 1959 |

FOREIGN PATENTS

| | | |
|---|---|---|
| 838,527 | Germany | May 8, 1952 |